United States Patent
Monagahn et al.

(10) Patent No.: US 7,321,383 B2
(45) Date of Patent: Jan. 22, 2008

(54) METHOD AND APPARATUS FOR BI-DIRECTIONAL VIDEO TELECONFERENCING ON MOBILE PLATFORMS

(75) Inventors: Patrick Monagahn, Maple Valley, WA (US); Gordon E. Letney, Sumner, WA (US); James B. Moore, Kent, WA (US)

(73) Assignee: The Boeing Company, Chicago, IL (US)

( * ) Notice: Subject to any disclaimer, the term of this patent is extended or adjusted under 35 U.S.C. 154(b) by 932 days.

(21) Appl. No.: 10/622,846

(22) Filed: Jul. 18, 2003

(65) Prior Publication Data
US 2004/0095461 A1     May 20, 2004

Related U.S. Application Data

(60) Provisional application No. 60/397,266, filed on Jul. 19, 2002.

(51) Int. Cl.
*H04N 7/14* (2006.01)
(52) U.S. Cl. ............... 348/14.02; 348/14.08; 348/14.01; 455/416
(58) Field of Classification Search .. 348/14.01–14.09, 348/14.1, 14.11, 14.12, 14.13; 455/416, 455/427, 517, 12.1, 17, 431; 709/238; 725/76
See application file for complete search history.

(56) References Cited

U.S. PATENT DOCUMENTS

| | | | | |
|---|---|---|---|---|
| 5,463,656 A | * | 10/1995 | Polivka et al. | 375/130 |
| 6,155,519 A | * | 12/2000 | Rajasingham | 244/118.6 |
| 6,813,777 B1 | * | 11/2004 | Weinberger et al. | 725/76 |
| 7,020,708 B2 | * | 3/2006 | Nelson et al. | 709/230 |
| 2002/0099854 A1 | * | 7/2002 | Jorgensen | 709/249 |
| 2003/0046344 A1 | * | 3/2003 | Kumhyr et al. | 709/205 |
| 2003/0084130 A1 | * | 5/2003 | D'Annunzio | 709/220 |
| 2003/0231238 A1 | * | 12/2003 | Chew et al. | 348/14.02 |

OTHER PUBLICATIONS

Mcintosh; Active Noise Cancellation Aircraft Headset system; WO 99/05998.*

* cited by examiner

*Primary Examiner*—Melur Ramakrishnaiah
(74) *Attorney, Agent, or Firm*—Robert R. Richardson, P.S.

(57) ABSTRACT

Bidirectional video teleconferences are provided on a mobile platform. A first video teleconference terminal is disposed on a mobile platform. A first local area network is arranged to provide network data services on the mobile platform and is arranged to communicate with the first video teleconference terminal. A second local area network is arranged to provide network data services and is arranged to communicate with a second video teleconference terminal. The first and second local area networks are in bidirectional packet data communications, and packets of video teleconference data are prioritized over packets of data for services other than video teleconferencing.

26 Claims, 5 Drawing Sheets

METHOD AND APPARATUS FOR BI-DIRECTIONAL VIDEO TELECONFERENCING ON MOBILE PLATFORMS

PRIORITY CLAIM

This application claims priority from U.S. patent application No. 60/397,266 filed on Jul. 19, 2002. The contents of which are hereby incorporated by reference.

FIELD OF THE INVENTION

This invention relates to worldwide systems for supplying bi-directional video teleconference services to mobile platforms, such as aircraft, using satellite communication.

BACKGROUND OF THE INVENTION

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of broadcast television (TV) services are available to terrestrial users via satellite links. Such services include commercial Direct Broadcast Satellite (DBS) services (such as DirecTV® and EchoStar®) and custom video, such as rebroadcast video, over private Fixed Satellite Services (FSS) or Broadcast Satellite Services (BSS) satellites. The data services which can be provided via satellite link include all conventional Internet services (e.g., email, web browsing, NetMeeting, etc.), as well as virtual private networks (VPNs) for corporate and government customers.

Previously developed systems which have attempted to provide live TV and data services to mobile platforms have done so with only limited success. One major obstacle has been the high cost of access to such broadband data and video services. Another problem is the limited capacity of previously developed systems, which is insufficient for mobile platforms carrying dozens, or even hundreds, of individuals who each may be simultaneously requesting different channels of programming or different data services. Furthermore, presently existing systems are generally not readily scalable to address the demands of the traveling public.

Certain services currently available provide a limited subset of the above described services. One such service provides a narrow-bandwidth Internet connection to users on a mobile platform. Another service provides either TV broadcast services from available direct broadcast signals (i.e., EchoStar® and DirectTV®) or provides a custom TV broadcast signal through dedicated satellite links (i.e., Airshow7). However, no system or method presently exists for providing high speed (i.e., greater than 64 Kbps) data networking services to groups of users on mobile or remote platforms, let alone for providing such high-speed networking services together with video services.

There are several operational systems that provide limited Internet data services on commercial airlines and cruise ships. These systems are very limited in their link capability (primarily use communication links developed for telephony) and the service is very expensive (greater than about $1.00 per minute for voice connection). For these reasons, and in view of adherent limitations on the capacity of such systems, such systems have met with limited commercial success and acceptance.

Current operational systems generally use Inmarsat satellite communication links or terrestrial wireless communication links (i.e., the National Air Telephone System "NATS") to achieve 2-way connectivity to mobile platforms. These connection forms have several drawbacks:

a limited connection bandwidth (typically less than 64 Kbps);

limited overall system capacity (due to limited frequency spectrum); and high expense.

Inmarsat operates in the L-band frequency spectrum, where there is very little bandwidth and capacity available for providing broadband services to the traveling public. NATS based solutions (i.e., GTE® Airfone7, AT&T® Claircom), familiar to domestic airline travelers who use seat back-mounted telephones, also provide very limited capacity because of operation at L-band. These systems also suffer from the additional problem that connectivity is only available over land.

Current mobile platform connection methods are inherently narrow band and restrict the flow of data to the point where common networking tasks are unbearably slow. Typically, this connectivity is achieved through the use of a standard computer telephone modem between the user's computer and the air-ground or ship shore telephony system. In this scenario, each user gets exclusive use of a full communications channel for the duration of his/her networking session and effectively prevents others from using that portion of the telephony system.

Another desirable service on a mobile platform is bi-directional video teleconferencing. However, providing a video teleconference service on a mobile platform is subject to connectivity challenges. For example, a video teleconference system on a mobile platform based on an ISDN system may be subject to frequent loss of connection. This is because a mobile platform, such as an airplane, may pitch and roll as the mobile platform moves. This movement may cause the antennas of the mobile platform to point away from the satellite being used which, in turn, causes the signal strength to drop. In an ISDN system, if the signal strength drops below a predetermined threshold signal level, the connection is lost. As a result, reliability of an ISDN-based video teleconference service may be less than desired for a commercially feasible service.

Another possible implementation of a bi-directional video teleconference service may be based on a network architecture, such as a wide area network like the Internet, that uses packet data. A video teleconference system based on a network architecture and installed on a mobile platform may not lose connection as often as an ISDN-based video teleconference system may lose connection. Instead, when signal strength of packet data communication drops, data rate slows. As a result, video teleconference images may be "jerky" or subject to "stop and go" presentation. Further, audio may be out of synchronization with video images. Finally, even if data rate is not subject to slowdown due to low signal strength, packets of video teleconference data may be put together slowly if the network system on the mobile platform is processing a large volume of packet data other than the video teleconference data.

As a result, there is an unmet need in the art for a method and system for video teleconference services on a mobile platform that provides reliable and robust connection and data rate independent of signal strength and processing demands placed on a network system by packet data other than video teleconference data.

SUMMARY OF THE INVENTION

Embodiment of the present invention provide a method and system for video teleconference services on a mobile platform. Reliable and robust connection and data rate are provided independent of signal strength and processing demands placed on a network system by packet data other than video teleconference data.

According to an exemplary embodiment of the present invention, bidirectional video teleconferences are provided on a mobile platform. A first video teleconference terminal is disposed on a mobile platform. A first local area network is arranged to provide network data services on the mobile platform and is arranged to communicate with the first video teleconference terminal. A second local area network is arranged to provide network data services and is arranged to communicate with a second video teleconference terminal. The first and second local area networks are in bidirectional packet data communications, and packets of video teleconference data are prioritized over packets of data for services other than video teleconferencing.

According to an aspect of the present invention, a plurality of headsets with noise canceling microphones are used onboard the mobile platform to accommodate background noise on the mobile platform.

According to a further aspect of the present invention, a stabilized camera is used onboard the mobile platform to accommodate vibration on the mobile platform.

BRIEF DESCRIPTION OF THE DRAWINGS

The preferred and alternative embodiments of the present invention are described in detail below with reference to the following drawings.

DETAILED DESCRIPTION OF THE INVENTION

Figure 3:
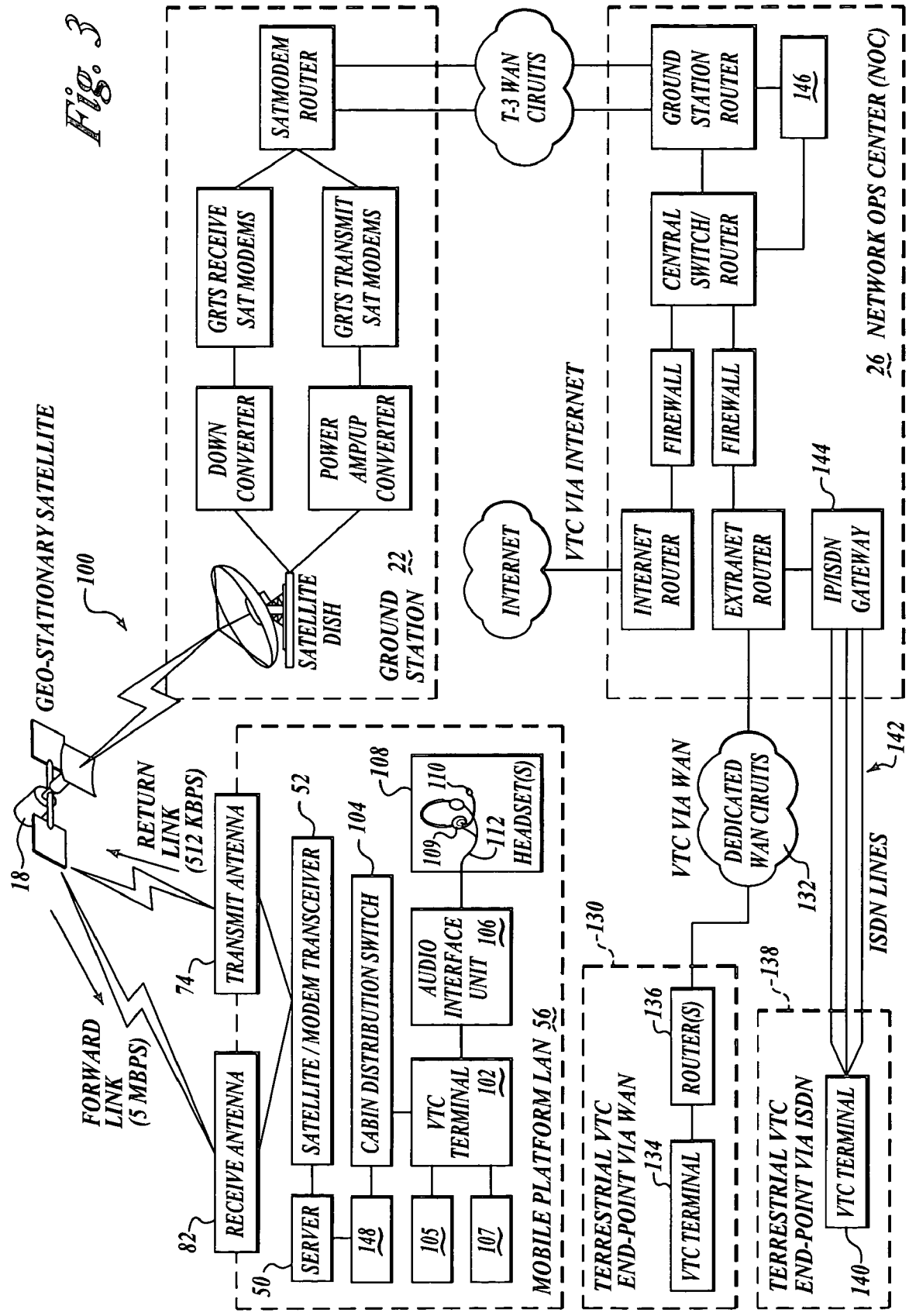
FIG. 3 is a block diagram of an exemplary video teleconferencing system onboard a mobile platform according to one embodiment of the present invention.

By way of overview, embodiments of the present invention provide bidirectional video teleconference services on a mobile platform. Referring briefly to FIG. 3 for an overview, a first video teleconference terminal is disposed on a mobile platform. A first local area network is arranged to provide network data services on the mobile platform and is arranged to communicate with the first video teleconference terminal. A second local area network is arranged to provide network data services and is arranged to communicate with a second video teleconference terminal. The first and second local area networks are in bidirectional packet data communications, and packets of video teleconference data are prioritized over packets of data for services other than video teleconferencing.

Exemplary embodiments of the present invention will be described in greater detail below. However, to provide a non-limiting context for understanding the present invention, an exemplary, non-limiting host environment is explained in which embodiments of the present invention are suitably implemented.

Exemplary Host Environment

Figure 1:
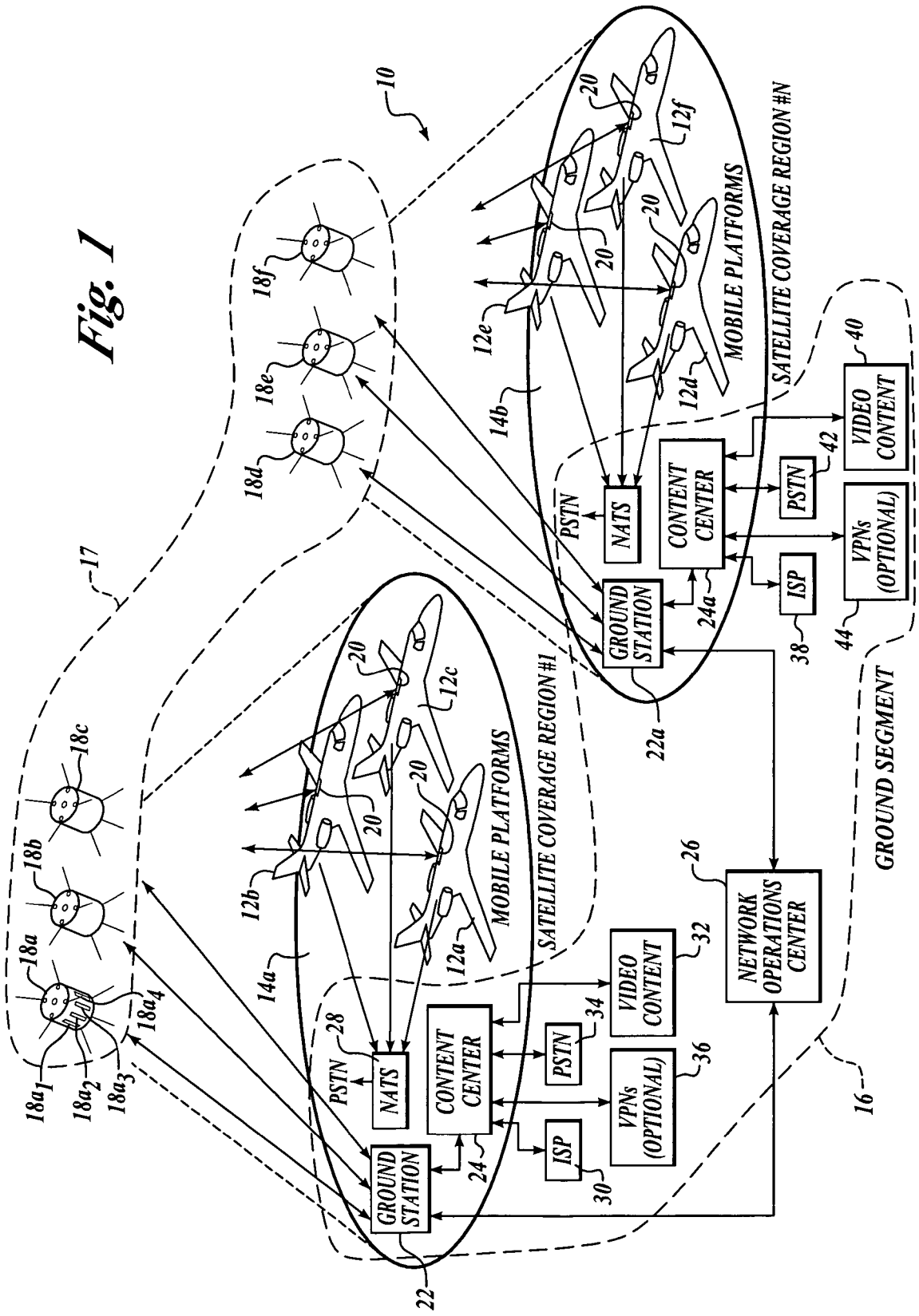
FIG. 1 is a simplified block diagram drawing illustrating the three major components of a system environment in which the present invention may be implemented.

Referring to FIG. 1, there is shown a system 10 (for providing data content to and from a plurality of mobile platforms 12a-12f in one or more distinct coverage regions 14a and 14b. The system 10 generally includes a ground segment 16, a plurality of satellites 18a-18f forming a space segment 17, and a mobile system 20 disposed on each moving platform 12. The mobile platforms 12 could include aircraft, cruise ships or any other moving vehicle. Thus, the illustration of the mobile platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this system include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$-$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could include any radio frequency band from approximately 1 OMHz to 100 GHz. The transponders preferably include Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$-$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is desired for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d-18f occur in coverage region 14b. It will also be understood that the system may be scaled to any number of coverage regions 14 in the manner just described.

The ground station 22 includes one or more antennas and associated antenna control electronics for transmitting data content to the satellites 18a and 18b. The antenna of the ground station 22 may also be used to receive data content transponded by the transponders $18a_1$-$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b.

Figure 2:
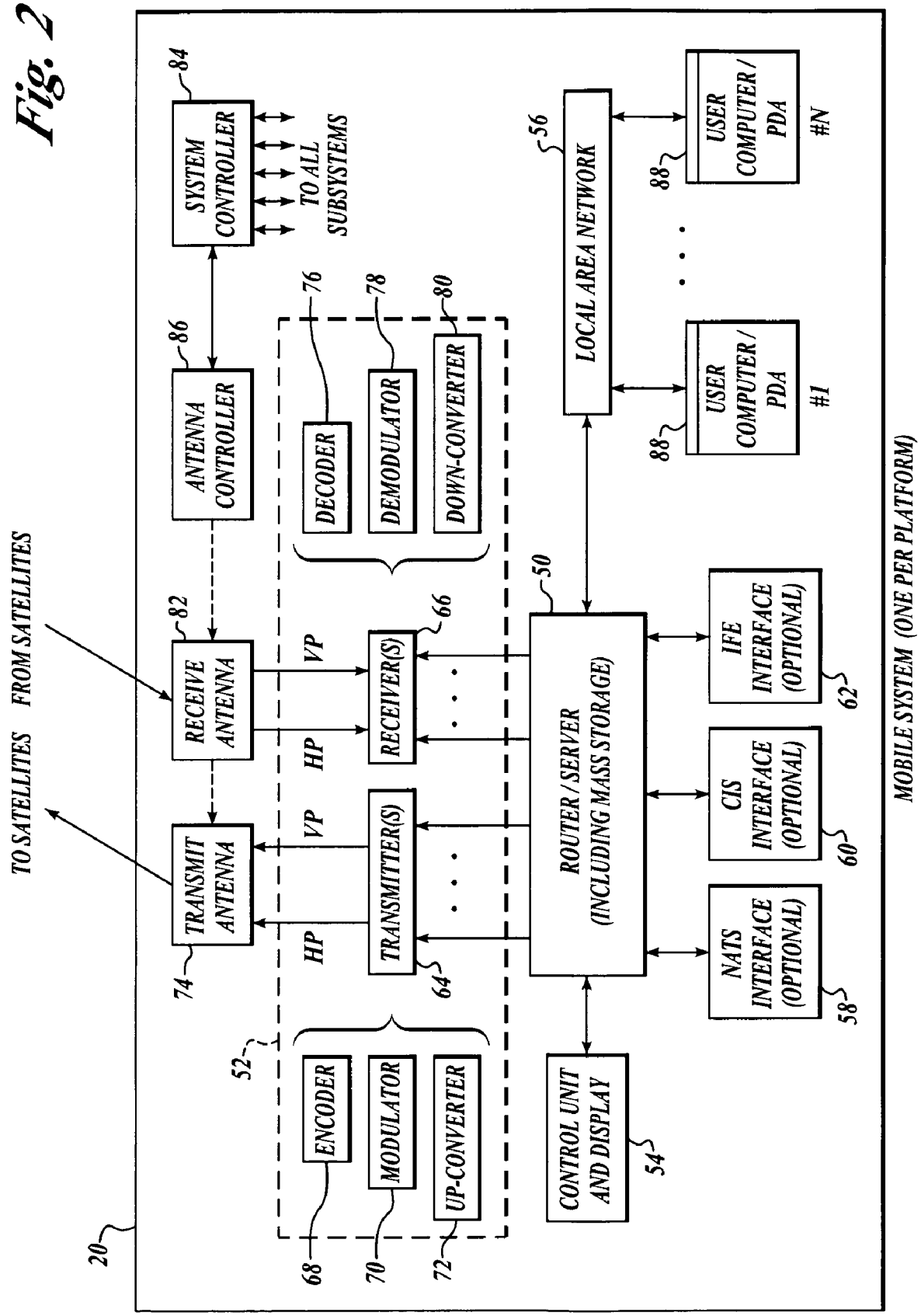
FIG. 2 is a block diagram of a mobile system carried on each mobile platform with which the present invention may be interfaced.

Referring now to FIG. 2, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76-80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each include a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may include any form of steerable antenna. In one preferred form, these antennas include electronically scanned, phased array antennas. Phased array antennas are especially well suited for aviation applications where aerodynamic drag is important considerations. One particular form of electronically scanned, phased array antenna suitable for use with the system is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$-$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 18. The receive antenna 74 of each aircraft receives the entire RF transmission of encoded RF signals representing the IP data content packets from at least one of the transponders $18a_1$-$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$-$18a4$ carried by the target satellite 18 to which it is pointed. The receiver 66 decodes, demodulates and down-converts the encoded RF signals to produce video and audio signals, as well as data signals, that are input to the server 50. The server 50 operates to filter off and discard any data content not intended for users on the aircraft 12a and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

The system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12a.

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile system 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile systems 20 may be assigned to a single transponder $18a_1$-$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of mobile platform position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders 18a1-18a4, and transponded by the designated transponder to the ground station 22. The ground station 22 communicates with the content center 24 to determine and provide the appropriate data being requested by the user (e.g., content from the world wide web, email or information from the user's VPN).

It will be appreciated that the system 10 provides a means for providing bi-directional data content transfer to a large plurality of independent users on-board a large number of mobile platforms. The system 10 further enables data content such as rebroadcast video services, broadcast video services and other forms of data content to be provided in real time to a large plurality of mobile platforms such as aircraft, ships or virtually any other form of mobile platform carrying individuals who desire to access ground-based data content sources or to view live television and programming. The system further allows multiple mobile platforms within a given coverage region to communicate with one or a plurality of transponders within the given coverage region and to transmit data content via a satellite back to a ground-based control system. Accordingly, individual users on-board the mobile platform are able to independently access and obtain various forms of data content as well as selected channels of live television programming. Importantly, the system 10 is scalable to accommodate large or small pluralities of mobile platforms, and also scalable over many satellites and coverage regions.

It will be appreciated that the description provided above regarding the system 10 is directed to an exemplary host environment in which the present invention is suitably implemented. The following description is directed to an exemplary, non-limiting embodiment of the present invention.

Video Teleconference Services on a Mobile Platform

FIG. 3 shows an exemplary, non-limiting embodiment of a system 100 for providing video teleconference (VTC) services on a mobile platform. The VTC system 100 is suitably implemented on a mobile platform using the system 10 discussed above. Components of the ground segment, space segment, and mobile segment of the system 10 have been discussed above. Details of construction and operation of the system 10 and components of its ground segment, space segment, and mobile segment are not necessary for an understanding of the VTC system 100. References made in FIGS. 3, 4 and 5 to exemplary models of components are made for illustrative purposes and are not intended to limit the scope of the system 10 or the VTC system 100.

Referring now to FIG. 3, an exemplary, nonlimiting, example of a VTC system 100 is installed on a mobile platform. The VTC system 100 includes a video teleconference terminal 102, such as without limitation a Tandberg 2500 or the like, that is connected to a switch 104 in the local area net 56 on the mobile platform. The VTC terminal 102 suitably connects to the airborne LAN 56 via an RJ45 jack (not shown). If desired, the RJ45 jack may be a dedicated jack for VTC only. The VTC terminal 102 suitably has a preassigned IP address (not via DHCP). video is supplied from a camera 105 to the VTC terminal 102, and video output is supplied from the VTC terminal 102 to a monitor 107. Presently, a high definition plasma screen is preferred, but it will be appreciated that any monitor may be used as desired for a particular application. VTC Control may be provided via a hand-held infrared remote control device, if desired. The components of the VTC system 100 are suitably Commercial Off-The-Shelf (COTS) equipment that are not aircraft certified. As a result, use of COTS equipment would be limited to operations on ground or above 10K ft only, and not during ascent or descent. An additional set of spares would entail certification with a Supplemental Type Certificate.

Use of the VTC system 100 by a group of participants onboard a mobile platform, such as an aircraft, entails compensating for a noisy environment. Because standard VTC units are designed to be used in a quiet conference room environment, audio inputs and outputs are designed for standard tabletop microphones and standard monitor speakers. However, high background noise onboard a flying aircraft prevents use of these standard devices. According to the present invention, a headset 108 with headphones 109 and a noise canceling microphone 110 is provided for each VTC participant.

Figure 4:
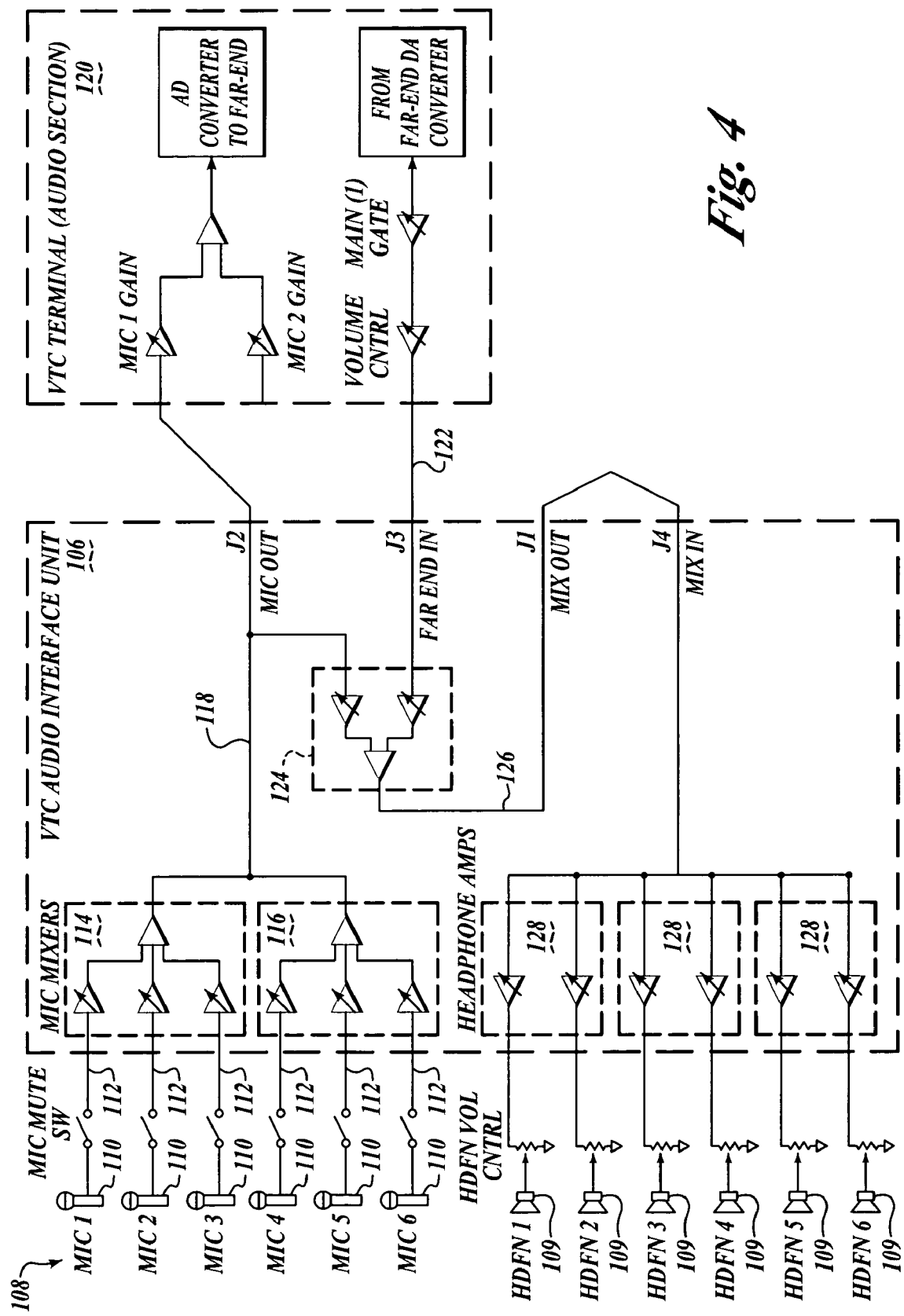
FIG. 4 is a block diagram of a detail of the system of FIG. 3.

Referring now to FIGS. 3 and 4, signals 112 are fed from the microphones 110 to mixing circuits 114 and 116 in the audio interface unit 106. The mixing circuits 114 and 116 combine the individual microphone signals 112 into one signal 118 for input into an audio section 120 of the VTC terminal 102.

According to the present invention, audio from all participants at all locations is provided to every headset 108. Because the participants on the mobile platform are wearing the headsets 108, any given participant on the mobile platform ordinarily may be unable to hear other participants on the mobile platform who may be seated at an opposite side of a conference table or aisle. Advantageously, the audio interface unit 106 combines near-end audio signals (from participants on the mobile platform) and far-end audio signals (from other locations) such that all participants on the mobile platform can hear each other as well as the far-end participants. To that end, the signal 118 and a far-end audio signal 122 from the audio section 120 are combined in a mixer 124. A combined audio output signal 126 is provided from the mixer 124 to headphone amplifiers 128. The headphones 109 are connected to receive amplified combined audio signals from the amplifiers 128. If desired, the headphones 109 may be noise canceling headphones. Advantageously, use of noise canceling headphones (in addition to use of noise canceling microphones) further enhances audio quality by minimizing and substantially eliminating background noise.

Referring back to FIG. 3, the camera 105 addresses issues regarding video quality. For example, vibration onboard the airplane entails use of special provisions to mount the camera 105. Rigorous experimentation with different vibration isolation devices and materials has yielded an optimum mount for the camera 105. It has been determined that too rigid of a mount produces unacceptable high frequency response, whereas too much isolation allows excessive low frequency camera movement. Accordingly, semi-rigid attachment of the camera 105 to an aircraft bulkhead has proven to give the most stable picture. In addition, use of an electronically stabilized camera further reduces the effects of airplane vibration.

Aircraft lighting presents another issue regarding video quality. Interior lighting can range from very bright when sun angles provide direct sunlight into the aircraft's cabin to nighttime operations using only standard aircraft interior lighting. As a result, use of a camera that supports a wide range of lighting is preferred.

Further, a video teleconference may include several participants onboard an aircraft. A pan-tilt-zoom camera provides the ability to capture either the entire group or individual participants.

The VTC system 100 includes a terrestrial VTC end-point 130 on a network 132, such as a wide area network (WAN). The terrestrial VTC end-point 130 includes a suitable VTC terminal 134, such as without limitation an acceptable Tandberg unit or the like, that is connected to a router 136 that is connected to the network 132. The network operations center 26 of the ground segment of the system 10 suitably connects to the network 132.

If desired, the system 100 may be used in multipoint conferences. Multipoint conferences are composed of many VTC units calling into a central hub (multipoint conference units). In this scenario, the mobile platform is added as another spoke on this hub.

If desired, the VTC system 100 may also connect to a terrestrial endpoint 138 via ISDN. The terrestrial endpoint 138 also includes a suitable VTC terminal 140, such as without limitation an acceptable Tandberg unit or the like, that is connected via ISDN lines 142 to an IP/ISDN gateway 144 that is part of the network operations center 26 of the system 10. The IP/ISDN gateway 144 provides connectivity to external sites not available via the wide area network 132, if desired.

As is known, currently the most prominent method for connecting and conducting terrestrial video teleconferences is via an ISDN (Integrated Services Digital Network), which are substantially high bandwidth telephone circuits. Advantageously, the IP/ISDN gateway device 144 provides a conversion from internet protocol (IP) packet data to a serial link for transmission over the standard ISDN lines 142. This enables a user on the mobile platform to connect to any terrestrial VTC endpoint 138 throughout the world that has ISDN connectivity.

It will be appreciated that VTC connectivity via the public internet not recommended to due to Quality of Service (that is, packet prioritization) issues. It will also be appreciated that it is desirable to ensure adequate capacity and minimize jitter to maintain VTC quality through the terrestrial network. WAN circuits within the network (and on the mobile platform) suitably may be DS-3 IP over SONET with redundant dedicated local access circuits on each end. Advantageously, this provides at least two times more terrestrial capacity than a radio frequency (RF) link.

A common mode of operation for the system 100 is asymmetrical operation. That is, bandwidth available to the mobile platform via the forward link is greater than bandwidth available from the mobile platform via the return link. Advantageously, the VTC system 100 is able to adapt to this asymmetric link, thereby providing the best picture available at each end for the available bandwidth.

It will be appreciated that RF link rates are higher than the VTC call rate. A 256K call rate can be considered to contain 256K of audio and video payload (overhead of RTP/UDP/IP packet headers are not counted). However, an actual data rate has been measured on the Ethernet output of the VTC terminal 102 on the order of around 300 Kbps for a 256K call.

Call initiation and scheduling is suitably a semi-automated process which may be overseen by an operator using suitable software, such as RF Link Management software. If desired, the operator may override automated link bandwidth settings to increase return bandwidth for a given mobile platform to support VTC. By way of non-limiting example, 256K may be considered a standard VTC call rate, with 384K RF return link rate. An example of one present link management plan shares transponders between mobile platforms. If desired, a VTC customer will contact the operator, such as by phone, to request increased return bandwidth for the VTC. The operator is also given start and stop times. It will be appreciated, however, that this process may be more automated or less automated, as desired, depending upon software that is used for initiating and scheduling calls.

It will be appreciated that the satellite RF links limit bandwidth of the VTC system 100 (compared to terrestrial based VTC systems) and that connection to this RF link bandwidth will be an issue. As a result, it is desirable that packets containing VTC data get priority over the satellite RF links. Quality of Service (QOS) mechanisms are used in both the ground and airborne equipment just prior to conversion to the RF signal, which is the bandwidth-limiting element in the VTC system 100. The QOS mechanisms provide priority transmission to the time critical nature of the audio and video data associated with VTC.

Figure 5:
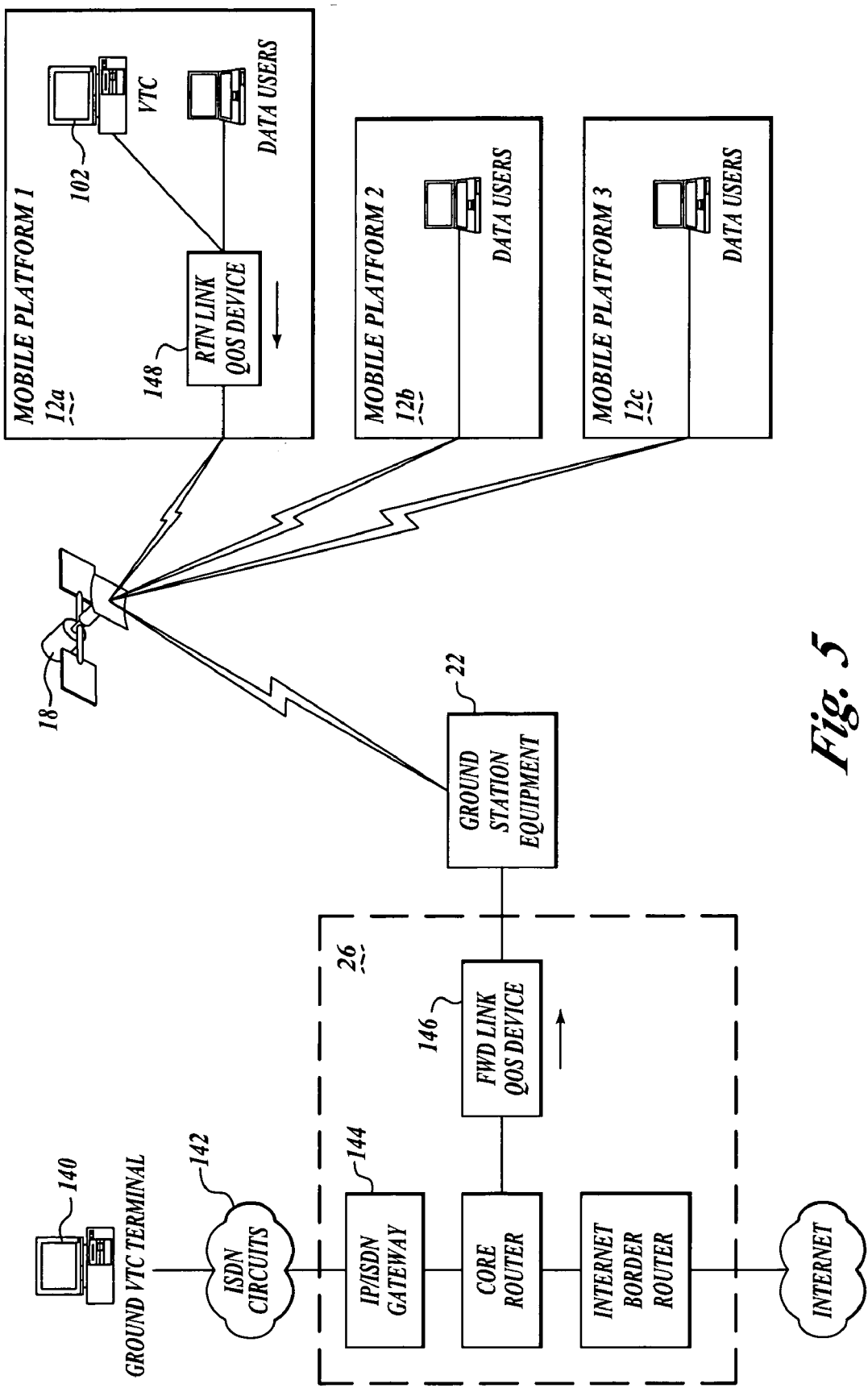
FIG. 5 is a block diagram of a quality-of-service feature.

FIG. 5 shows a block diagram of a Quality of Service (QOS) feature. It will be appreciated that VTC traffic is very time critical and packet retransmission is not a viable option. For example, audio packets may entail 96 bytes (50 packets per second) and video packets may entail 1154 bytes (30 packets per second). Therefore, it is desirable to give priority to packets of VTC data over other, non-VTC packets of data. To that end, a forward link QOS device 146 is coupled to the router in the ground station 22 and a return link QOS device 148 is coupled between the server 50 (FIG. 3) and the switch 104 (FIG. 3) in the mobile platform. In one embodiment, the QOS devices 146 and 148 identify VTC traffic by source and destination addresses. Advantageously, this allows priority to be given to VTC sub-net addresses. Given by way of non-limiting example, Packeteer PacketShaper 4500 is a suitable prioritization product that provides for Quality of Service (QOS). Packeteer PacketShaper provides a web browser management interface, extensible traffic class definitions, SNMP reporting, policy-based priority enforcement, application bandwidth allocation, and on-board historical reporting.

Alternately, the VTC endpoint itself may contain features that improve VTC quality for IP based calls. Currently, these features may include: packet marking using IP Precedence and DiffServ; Packet Ordering; Packet Duplication Control; Jitter Correction; Lip Sync Correction; Lip Sync Delay Adjustment; Overhead Prediction; Adaptive Bandwidth Adjustment; Maximum Packet Size Adjustment; NAT IP Address Mask; and Asymmetric Network Transmission. Details of VCON's PacketAssist archticture are set forth in VCON's white paper of May 2001 entitled "PacketAssist: An Architectural Approach to Delivering Quality of Service (QOS) for IP Video" which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for providing bidirectional video teleconferences on a mobile platform, the system comprising:
   a first video teleconference terminal disposed on a mobile platform;
   a first local area network arranged to provide network data services on the mobile platform and arranged to communicate with the first video teleconference terminal;
   a second video teleconference terminal disposed at a terrestrial station; and
   a second local area network arranged to provide network data services and arranged to communicate with the second video teleconference terminal, the first and second local area networks being in asymmetrical bidirectional packet data radio frequency communications via a forward satellite link from the terrestrial station having a forward link rate that is substantially greater than a videoteleconference call rate and a return satellite link from the mobile platform having a return link rate that is adjustable to support the videoteleconference call rate, wherein packets of video teleconference data are prioritized over packets of data for services other than video teleconferencing.

2. The system of claim 1, further comprising a first quality of service device coupled between the first video teleconference terminal and the first local area network on the mobile platform and arranged to prioritize first packets of video teleconference data that are transmitted from the mobile platform over second packets of data that are transmitted from the mobile platform for services other than video teleconferencing.

3. The system of claim 2, further comprising a second quality of service device coupled between the second video teleconference terminal and the second local area network and arranged to prioritize third packets of video teleconference data that are transmitted to the mobile platform over fourth packets of data that are transmitted to the mobile platform for services other than video teleconferencing.

4. The system of claim 1, further comprising:
   a plurality of headsets, each headset having a microphone and at least one headphone; and
   an audio interface unit connectable to the first video teleconference terminal and the plurality of headsets, the audio interface unit being arranged to supply to all of the headphones an audio signal that includes first audio signal components from all of the microphones and that further includes a second audio signal component from the second video teleconference terminal.

5. The system of claim 4, wherein the microphones include noise canceling microphones.

6. The system of claim 4, wherein the headphones include noise canceling headphones.

7. The system of claim 1, wherein the mobile platform includes an aircraft.

8. A system for providing bidirectional video teleconferences on a mobile platform, the system comprising:
   a first video teleconference terminal disposed on a mobile platform;
   a first local area network arranged to provide network data services on the mobile platform and arranged to communicate with the first video teleconference terminal;
   a second video teleconference terminal disposed at a terrestrial station;
   a second local area network arranged to provide network data services and arranged to communicate with the second video teleconference terminal, the first and second local area networks being in asymmetrical bidirectional packet data radio frequency communications via a forward satellite link from the terrestrial station having a forward link rate that is substantially greater than a videoteleconference call rate and a return satellite link from the mobile platform having a return link rate that is adjustable to support the videoteleconference call rate, wherein packets of video teleconference data are prioritized over packets of data for services other than video teleconferencing;
a first quality of service device coupled between the first video teleconference terminal and the first local area network on the mobile platform and arranged to prioritize first packets of video teleconference data that are transmitted from the mobile platform over second packets of data that are transmitted from the mobile platform for services other than video teleconferencing;
a second quality of service device coupled between the second video teleconference terminal and the second local area network and arranged to prioritize third packets of video teleconference data that are transmitted to the mobile platform over fourth packets of data that are transmitted to the mobile platform for services other than video teleconferencing;
a plurality of headsets, each headset having a microphone and at least one headphone; and
an audio interface connectable to the first video teleconference terminal and the plurality of headsets, the audio interface unit being arranged to supply to all of the headphones an audio signal that includes first audio signal components from all of the microphones and that further includes a second audio signal component from the second video teleconference terminal.

9. The system of claim 8, wherein the microphones include noise canceling microphones.

10. The system of claim 8, wherein the headphones include noise canceling headphones.

11. The system of claim 8, wherein the mobile platform includes an aircraft.

12. A system for providing bidirectional video teleconferences on a mobile platform, the system comprising:
a video teleconference terminal disposed on a mobile platform;
a local area network arranged to provide network data services on the mobile platform and arranged to communicate with the first video teleconference terminal;
a satellite transceiver coupled to the local area network and arranged to asymmetrically transmit and receive first packets of video teleconference data and second packets of data for services other than video teleconferencing via a return satellite link from the mobile platform having a return link rate that is adjustable to support a videoteleconference call rate and a forward link rate that is substantially greater than the videoteleconference call rate; and
a quality of service device coupled between the video teleconference terminal and the local area network on the mobile platform and arranged to prioritize the first packets of video teleconference data that are transmitted from the mobile platform over the second packets of data that are transmitted from the mobile platform for services other than video teleconferencing.

13. The system of claim 12, further comprising:
a plurality of headsets, each headset having a microphone and at least one headphone; and
an audio interface connectable to the video teleconference terminal and the plurality of headsets, the audio interface unit being arranged to supply to all of the headphones an audio signal that includes first audio signal components from all of the microphones and that further includes a second audio signal component received by the transceiver from a remote video teleconference terminal.

14. The system of claim 13, wherein the microphones include noise canceling microphones.

15. The system of claim 13, wherein the headphones include noise canceling headphones.

16. The system of claim 13, wherein the mobile platform includes an aircraft.

17. An aircraft comprising:
a fuselage;
transmit and receive antennas mounted on the fuselage; and
a system for providing bidirectional video teleconferences on the aircraft, the system comprising:
a videoteleconference terminal;
a local area network arranged to provide network data services on the aircraft and arranged to communicate with the video teleconference terminal;
a satellite transceiver coupled to the local area network and to the transmit and receive antennas, the satellite transceiver being arranged to asymmetrically transmit and receive first packets of video teleconference data and second packets of data for services other than video teleconferencing via a return satellite link from the mobile platform having a return link rate that is adjustable to support a videoteleconference call rate and a forward link rate that is substantially greater than the videoteleconference call rate; and
a quality of service device coupled between the first video teleconference terminal and the first local area network on the aircraft and arranged to prioritize the first packets of video teleconference data that are transmitted from the aircraft over the second packets of data that are transmitted from the aircraft for services other than video teleconferencing.

18. The aircraft of claim 17, further comprising:
a plurality of headsets, each headset having a microphone and at least one headphone; and
an audio interface connectable to the video teleconference terminal and the plurality of headsets, the audio interface unit being arranged to supply to all of the headphones an audio signal that includes first audio signal components from all of the microphones and that further includes a second audio signal component received by the transceiver from a remote video teleconference terminal.

19. The aircraft of claim 18, wherein the microphones include noise canceling microphones.

20. The aircraft of claim 18, wherein the headphones include noise canceling headphones.

21. A method for conducting a video teleconference on a mobile platform, the method comprising:
providing a video teleconference terminal on a mobile platform;
placing first packets of video teleconference data on a local area network on the mobile platform;
prioritizing the first packets of video teleconference data to be transmitted from the mobile platform over second packets of data to be transmitted from the mobile platform for services other than video teleconferencing; and
transmitting the first packets of video teleconference data from the mobile platform via asymmetrical satellite radio frequency communications through a return satellite link from the mobile platform having a return link rate that is adjustable to support a videoteleconference call rate.

22. The method of claim 21, further comprising prioritizing third packets of video teleconference data to be transmitted to the mobile platform over fourth packets of data to be transmitted to the mobile platform for services other than video teleconferencing.

23. The method of claim 21, further comprising:
   providing a headset to each video teleconference participant on the mobile platform, each headset having a microphone and at least one headphone; and
   supplying to all of the headphones an audio signal that includes first audio signal components from all of the microphones and that further includes a second audio signal component received from a remote video teleconference terminal.

24. The method of claim 23, further comprising canceling noise from the microphones.

25. The method of claim 23, further comprising canceling noise in the headphones.

26. The method of claim 21, wherein the mobile platform includes an aircraft.

* * * * *